United States Patent [19]

Jasperse et al.

[11] Patent Number: 4,530,609
[45] Date of Patent: Jul. 23, 1985

[54] CONVEYOR ROLL BEARING
[75] Inventors: Philip D. Jasperse, Zeeland; Siegfried K. Weis, Conklin; Milo D. Sovis, Jr., Grand Haven, all of Mich.
[73] Assignee: FROCEMCO, Inc., Grand Rapids, Mich.
[21] Appl. No.: 520,113
[22] Filed: Aug. 3, 1983
[51] Int. Cl.³ .............................................. F16C 33/78
[52] U.S. Cl. ................................... 384/482; 384/515; 384/909
[58] Field of Search ................. 308/187.1, 187.2, 191, 308/208, 189 R, 207 R; 384/482, 515, 513, 607, 615, 909

[56] References Cited

U.S. PATENT DOCUMENTS

| | | | |
|---|---|---|---|
| 718,376 | 1/1903 | O'Reilly . | |
| 859,083 | 7/1907 | Knipe . | |
| 886,949 | 5/1908 | Cornforth . | |
| 998,099 | 7/1911 | Knipe . | |
| 1,194,043 | 8/1916 | Laycock . | |
| 1,948,105 | 2/1934 | Ford | 308/189 |
| 2,098,709 | 11/1937 | Murden et al. | 308/236 |
| 2,375,304 | 5/1945 | Kulduff | 175/264 |
| 2,823,553 | 2/1958 | Harrington | 74/243 |
| 2,823,967 | 2/1958 | Harrington | 308/187.2 |
| 2,863,701 | 12/1958 | Jones et al. | 301/5.7 |
| 2,878,084 | 3/1959 | Bermingham | 308/187.1 |
| 2,955,884 | 10/1960 | Marshall | 308/190 |
| 2,977,162 | 3/1961 | Brooks | 308/193 |
| 3,007,753 | 11/1961 | Potter | 308/236 |
| 3,081,206 | 3/1963 | Remer | 154/43 |
| 3,084,004 | 4/1963 | Henley | 308/187.2 |
| 3,097,898 | 7/1963 | Ferdig | 308/190 |
| 3,129,904 | 4/1964 | Hanson | 244/17.19 |
| 3,142,520 | 7/1964 | Mueller | 308/187.2 |
| 3,171,697 | 3/1965 | Nicolaides | 308/3.8 |
| 3,230,022 | 1/1966 | Znamirowski | 308/195 |
| 3,343,894 | 9/1967 | Fisher, Jr. | 308/187.2 |
| 3,564,477 | 2/1971 | Pompei | 339/5 |
| 3,584,924 | 6/1971 | O'Neill | 308/187.2 |
| 3,806,215 | 4/1974 | Price et al. | 308/236 |
| 3,825,312 | 7/1974 | Allaben, Jr. | 308/236 |
| 3,828,411 | 8/1974 | Zahn | 29/148.4 S |
| 3,858,950 | 1/1975 | Otto | 308/187.1 |
| 3,870,384 | 3/1975 | Ladin | 308/187.2 |
| 3,874,028 | 4/1975 | Ernst et al. | 16/136 |
| 3,897,988 | 8/1975 | Dickinson et al. | 308/189 R |
| 3,917,425 | 11/1975 | Allaben, Jr. | 403/371 |
| 3,924,908 | 12/1975 | Gotham et al. | 308/20 |
| 3,938,901 | 2/1976 | Howe, Jr. | 403/350 |
| 3,953,142 | 4/1976 | Price et al. | 403/371 |
| 3,966,276 | 6/1976 | Bellarbre et al. | 308/238 |
| 3,975,067 | 8/1976 | Lucien | 308/216 |
| 4,033,643 | 7/1977 | Miller et al. | 308/187.2 |
| 4,138,168 | 2/1979 | Herlitzek | 308/189 R |
| 4,336,972 | 6/1982 | Dagiel | 308/233 |
| 4,452,497 | 6/1984 | Zillhardt | 308/187.1 |

FOREIGN PATENT DOCUMENTS

| | | |
|---|---|---|
| 237138 | of 0000 | Australia . |
| 636923 | of 0000 | Canada . |
| 1042308 | of 0000 | Fed. Rep. of Germany . |
| 2339773 | of 0000 | France . |
| 2024371 | of 0000 | United Kingdom . |
| 895059 | 4/1962 | United Kingdom . |

OTHER PUBLICATIONS

C. L. Frost & Son drawing No. 7710639, Name: Cover Ring, Date: 10/24/68.
C. L. Frost & Son drawing No. 7710730, Name: Trolley Wheel, Date: 7/31/81.
C. L. Frost & Son drawing No. 7710630; Name: Trolley Wheel, Date: 10/24/68.
C. L. Frost & Son drawing No. 7710631, Name: Outer Race, Date: 10/23/68.
C. L. Frost & Son drawing No. 7710632, Name: Inner Race-Blank, Date: 11/20/68.

Primary Examiner—Lenard A. Footland
Attorney, Agent, or Firm—Price, Heneveld, Huizenga & Cooper

[57] ABSTRACT

The specification discloses a light-duty conveyor roll bearing which is quiet, static conductive, and capable of operating at relatively high speeds. The bearing includes a stamped, cup-shaped outer race; an inner race positioned therein; and an end cap crimped to the rim of the outer race to shield one side of the ball raceway, to provide a thrust bearing surface for the balls, and to provide a seal contacting surface. Opposite the end cap, the outer race extends radially inwardly adjacent to or beyond the inner race to shield the other side of the ball raceway. A graphite-filled, electrically conductive, polymeric hub supports the inner race and includes an annular seal contacting the end cap to seal the one side of the ball raceway.

10 Claims, 3 Drawing Figures

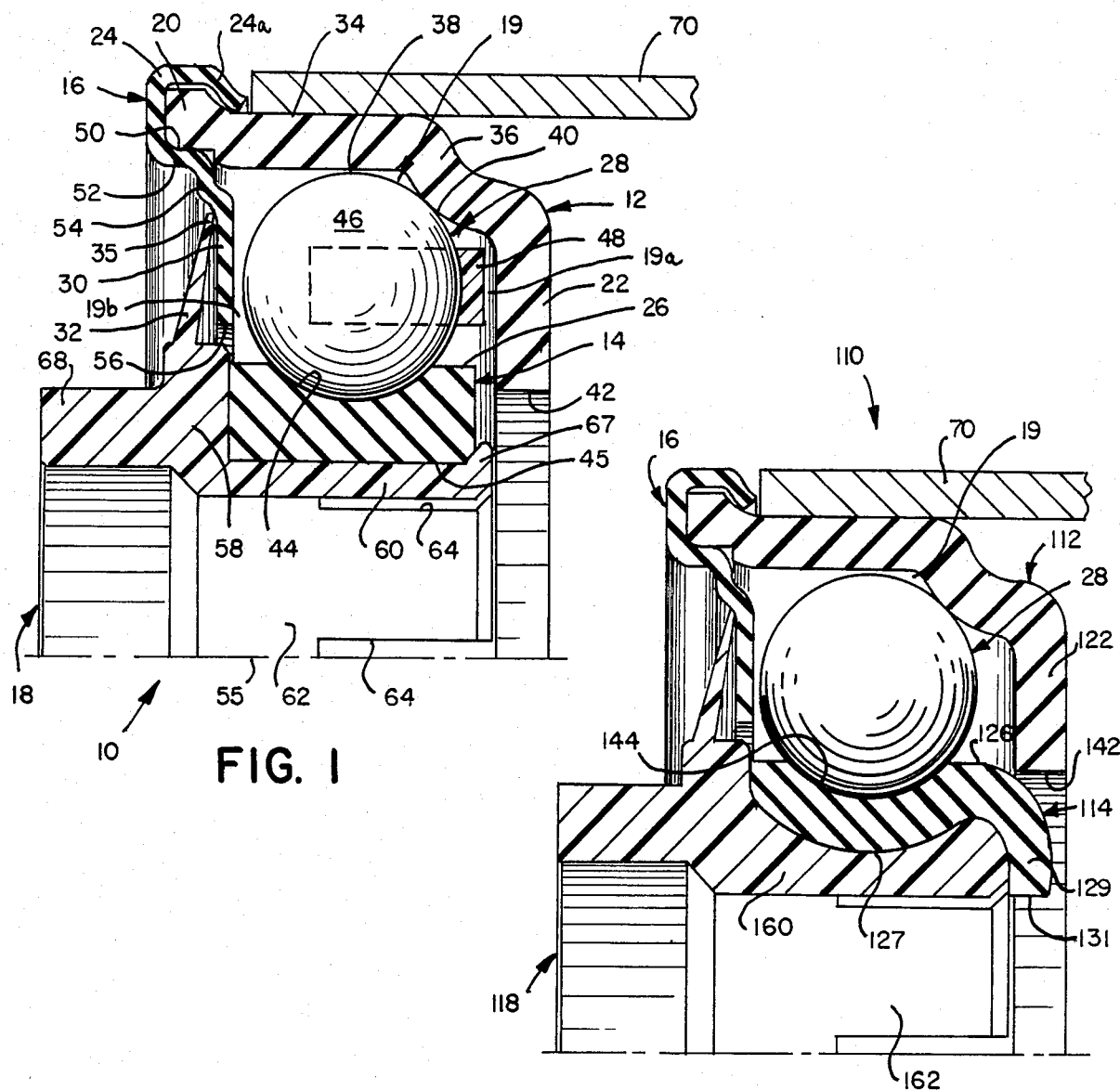

CONVEYOR ROLL BEARING

BACKGROUND OF THE INVENTION

The present invention relates to conveyor roll bearings, and more particularly to light-duty conveyor roll bearings.

A wide variety of conveyor roll bearings has been developed to rotatably support a conveyor roll in a conveyor system. Typically, the conveyor roll is hollow and one bearing is press-fitted into each of the opposite ends of the roll to rotatably mount the roll on a frame. Each bearing includes an inner race assembly mounted on a support shaft and an outer race assembly rotatably supporting the conveyor roll. A row of balls is positioned between the two race members to rotatably support the outer race member on the inner race member.

In particular, a variety of light-duty conveyor roll bearings has been developed to provide requisite load-bearing characteristics at a reasonable cost. These light-duty bearings are utilized in a variety of environments including electronic assembly, cosmetic manufacture, breweries, and retail warehouses. One such bearing includes a stamped, cup-shaped, outer bearing member; an inner race member; and a ball row positioned within the raceway defined by the inner and outer race members. The cup-shaped outer race member facilitates assembly because the inner race with the balls positioned thereabout may be simply dropped into the outer race. The open side of the cup-shaped outer race is then closed by a hardened thrust washer held in position by a separate retainer crimped about the body of the outer race. Thrust washers are required in these nonprecision bearings because the noncritical tolerances permit relative axial movement of the bearing elements. Although this bearing is adequate in many applications, it is not without its drawbacks.

First, one or both of the sides of the ball raceway are open between the inner and outer race members. Therefore, the bearing is subject to contamination and lubricant loss. Second, the cup-shaped outer race must be closed at its open end by a relatively expensive, two-piece assembly including a hardened thrust washer and a softer retaining piece securing the thrust washer in position. Third, conveyor roll bearings are typically noisy because of the metal-to-metal contact between the bearing and the support shaft. Although some artisans have attempted to alleviate noise problems by including a polymeric, vibration-absorbing hub between the bearing and the support shaft, this attempted solution insulates the conveyor rolls and causes them to build up static charges as a result of conveyor operation. These charges are particularly undesirable in electronics applications.

SUMMARY OF THE INVENTION

The aforementioned problems are overcome by the present invention comprising a sealed, static conductive, light-duty conveyor roll bearing which provides desired performance at a fraction of the cost of previous bearings. More particularly, the bearing includes a cup-shaped outer race member, an inner race member fitted therein to define a ball raceway therebetween, an end cap secured to the rim of the cup-shaped outer race member, and a hub fitted within the inner race member and including an annular shield engaging the end cap. The cup-shaped outer race member includes an annular shielding portion extending radially inwardly closely proximate the inner race member on one side of the ball raceway to shield that side against contaminants and to reduce lubrication loss. Preferably, the end cap is suitably hardened to provide a thrust bearing surface extending radially inwardly from the rim of the outer race member. The annular hub sealing flange bears against the end cap to seal the second side of the raceway against contaminants and to prevent lubricant loss.

The present bearing can be manufactured considerably below the cost of known bearings. In particular, a substantially simpler assembly is provided with fewer parts wherein the end cap serves both as a bearing shield and a thrust bearing surface. Such end cap eliminates the previous need for a two-piece construction including a separate thrust washer and end cap for the open end of the cup-shaped outer race. Second, the crimping of the end cap directly about the lip or rim of the cup-shaped outer race results in a significant material savings over known constructions wherein the thrust bearing retainer extends a significant distance about the body of the outer race member.

The present invention provides a relatively simple bearing sealed at one side and shielded at the other side of the ball raceway to prevent the entrance of contaminants into the bearing and to reduce leakage of lubricant from the ball row. Specifically, one side of the ball row is nearly closed by the "bottom" of the cup-shaped outer race which extends radially inwardly beyond the inner race member. The opposite side of the ball row is sealed by the one-piece, combination end cap/thrust washer in conjunction with the annular hub seal extending radially outwardly from the hub.

Preferably, the hub is fabricated of polymeric, electrically conductive material. This insures that all static charges are properly dissipated to the support shaft as is desirable in applications involving the transportation of electronic components and parts. In addition, the polymeric hub isolates and/or dampens noise transferred from the conveyor roller to the supporting frame or chassis.

These and other objects, advantages, and features of the invention will be more fully understood and appreciated by reference to the detailed description of the preferred embodiments and the drawings.

BRIEF DESCRIPTION OF THE DRAWINGS

FIG. 1 is a fragmentary, sectional view of the conveyor roll bearing of one embodiment of the present invention;

FIG. 2 is a perspective, sectional, exploded view of the bearing with a full-ball complement substituted for the retainer complement illustrated in FIG. 1; and FIG. 3 is a fragmentary, sectional view of an alternative embodiment of the bearing including a stamped inner race having a radially inwardly extending flange to engage a support shaft.

DETAILED DESCRIPTION OF THE PREFERRED EMBODIMENT

A conveyor roll bearing constructed in accordance with a preferred embodiment of the invention is illustrated in the drawing and generally designated 10. Basically, the bearing comprises outer race member 12, inner race member 14, end cap 16, and hub 18. Race members 12 and 14 together define ball raceway 19 in which ball complement or row 28 including balls 46 is positioned. Outer race member 12 is generally cup-shaped and includes a rim or lip 20 and an opposite bottom wall 22. Rim 20 serves as a crimping bead enabling end cap 16 to be secured to outer race member 12 by crimping peripheral portion 24 of the end cap about the rim. Bottom wall 22 extends generally radially inwardly from the remainder of outer race member 12 beyond inner race periphery 26 to shield ball complement 28. End cap 16 includes thrust bearing wall 30 extending generally radially inwardly from peripheral portion 24. Thrust bearing wall 30 provides a load-bearing thrust support and bearing surface for ball complement 28 and also shields ball complement 28. Hub 18 supports inner race 14 and includes annular seal 32 extending radially outwardly and contacting end cap 16 to complete the seal of ball complement 28 at the open end of outer race member 12.

Turning more specifically to the construction of the various elements of bearing 10, outer race member 12 (FIGS. 1 and 2) is a generally cup-shaped member including outer cylindrical wall 34 and bottom wall 22 generally perpendicular thereto. Walls 34 and 22 are interconnected by arcuate corner portion 36 which extends convexly into the raceway 19. Outer wall 34 and corner portion 36 provide a two-point contact for balls 46 at points 38 and 40 to carry both radial and thrust (or axial) loads of ball complement 28. Outer raceway 19 is defined as the area between and including points 38 and 40. Rim portion 20 defines a crimping bead for end cap 16 and extends about the periphery of cup-shaped outer race 12. Rim portion or bead 20 is radially offset from the remainder of outer wall 34 to facilitate assembly with, and retention of, end cap 16 as set forth below. Bottom wall 22 extends from arcuate corner portion 36 radially inwardly beyond inner race periphery 26 to shield open end 19a of raceway 19. The inner diameter of aperture 42 defined by bottom wall 22 is smaller than the external diameter of inner race periphery 26. The cooperation of bottom wall 22 and the adjacent side surface of inner race 14 both reduces the possibility that contaminants will enter raceway 19 and helps retain lubricant within the raceway. In the preferred embodiment, outer race 12 is a stamped member fabricated of AKDQ (Aluminum Killed Drawing Quality) steel case-hardened. Other suitable materials providing an appropriate wear surface could of course be substituted for this preferred material.

Inner race member 14 (FIGS. 1 and 2) is a generally cylindrical member fitted within outer race 12 to define raceway 19. Inner raceway 44 is defined in peripheral surface 26. The balls or rolling elements 46 forming ball complement 28 ride on inner raceway 44. The inner bore or surface 45 of race 14 is cylindrical in this embodiment and corresponds to a cylindrical receiving area on hub 18 as explained below. Of course, the inner surface could be curved as explained below in connection with embodiment 110. In the preferred embodiment, inner race 14 is machined from resulphurized low-carbon steel case-hardened. Of course, other suitable materials could be substituted for this preferred material.

Ball complement 28 illustrated in FIG. 1 includes a plurality of balls 46 preferably secured within a nylon ball retainer 48. Seven such balls are included within the retainer complement illustrated in FIG. 1. Alternatively, retainer 48 can be omitted, in which case preferably ten balls are included in the full-ball complement partially illustrated in FIG. 2. Each of balls 46 rides on inner raceway 44 of inner race member 14 and rides against contact points 38 and 40 of outer race member 12.

End cap 16 is a generally disc-shaped member crimpingly secured to outer race rim 20. End cap 16 serves the three functions of shielding side 19b of raceway 19, providing a load bearing thrust support and thrust bearing surface for balls 46, and providing the seal contacting surface for lip 35. Peripheral portion 24 is crimped about the radial offset rim 20 to secure end cap 16 to outer race 12. Annular shoulder 50 extends axially inwardly from peripheral portion 24 to abut inner surface 52 of outer race rim portion 20 to maintain the roundness of the outer race. Thus, even if the circular shape of outer wall 34 of outer race 12 is slightly distorted during heat treating, the circular shape of shoulder 50 helps return and retain the outer wall in its proper shape upon assembly. Curvilinear portion 54 interconnects shoulder 50 and thrust bearing wall 30, which is oriented generally radially with respect to axis 55 of bearing 10. Wall 30 extends generally radially inwardly from peripheral portion 24 and terminates just short of inner race periphery 26 to define aperture 56. In the preferred embodiment, end cap 16 is fabricated from low-carbon steel surface-hardened. The need for a separate thrust washer is eliminated. Further, the fabrication of end cap 16 from a relatively hard material enables peripheral portion 24 to be crimped directly about rim 20. This construction results in a significant material savings in end cap 16 over known constructions wherein a relatively soft end cap must extend about a relatively large portion of the outer race to provide the requisite securement of the end cap to the bearing.

Hub 18 (FIGS. 1 and 2) is a one-piece polymeric member including shoulder 58, neck 60, and seal 32. Neck 60 defines an internal hex bore 62 and includes a cutout portion 64 at each corner 66 of the hex bore. Each cutout portion 64 extends from end flange or lip 67 and terminates short of shoulder 58. Neck 60 can therefore be compressed radially inwardly to be inserted into inner race 14 during assembly of the bearing. The exterior of neck 60 has a cylindrical surface which receives inner race surface 45. Inner race 14 is retained on that surface by flange or lip 67. Shoulder 58 includes an external hex portion 68 facilitating installation of bearing 10 on a support shaft (not shown). Annular seal 32 extends radially outwardly from shoulder 58, and slants slightly axially inwardly such that it is biased against thrust wall 30 to complete the seal of raceway side 19b. Seal 32 is preferably tapered rectilinearly from its root section at its jointure to shoulder 58 to peripheral annular edge 35 where it terminates. Peripheral edge 35 contacts wall 30 at a location closely proximate curvilinear portion 54. Of course, seal 32 might engage wall 30 at any point along the radial extent of the wall.

In the preferred embodiment, hub 18 is electrically conductive to dissipate through the support shaft any static electrical charge from the bearing which may build up during bearing rotation. Outer race member 12, inner race member 14, and end cap 16, which are all fabricated of steel, are also electrically conductive to transmit any charge through the hub to the support shaft (not shown) which serves as an electrical ground. In the preferred embodiment, hub 18 is fabricated from PI-195 urethane made by K. J. Quinn & Co. of Malden, Mass. Hub 18 is either filled with a graphite material, or dip-coated, such that the resultant hub has an electrical resistivity in the range of 1 mega-ohm. Hub 18 is body conductive if graphite-filled and surface conductive if dip-coated. Of course, any other suitable polymer could be used. Such materials also contribute to the quiet operation of bearing 10 by isolating and dampening the transfer of noise or vibration through the bearing from conveyor roller to supporting frame.

ASSEMBLY

In the preferred method of assembly, race members 12 and 14, end cap 16, and hub 18 are all separately fabricated. Specifically, outer race 12 and end cap 16 are stamped; inner race 14 is machined; and hub 18 is injection molded. Ball complement 28 including balls 46 mounted within retainer 48 is positioned about inner race 14 such that balls 46 are seated on inner raceway 44. The ball-complement-and-inner-race assembly is slid into outer race 12 until balls 46 are seated against contact points 38 and 40. End cap 16 is slid onto outer race 12, and more particularly, peripheral portion 24 is positioned about rim 20. Peripheral portion 24 is then crimped as indicated at 24a (FIG. 1) to secure the end cap to the outer race and to secure ball complement 28 and races 12 and 14 in operating relationship. Finally, hub 18 is inserted into inner race 14 by first compressing collar 60 radially inwardly until lip 67 can be slid through inner race 14. As hub 18 is slid into inner race 14, seal 32 engages and is biased against thrust bearing wall 30 to seal open side 19b of raceway 19. When collar 60 is fully inserted within inner race 14, shoulder 58 abuts the inner race and collar 60 springs radially outwardly with lip 67 positioned beyond the inner race. The completed bearing assembly 10 is mounted on a support shaft (not shown) using techniques well known to those having ordinary skill in the art. Also as is well known, a conveyor roll 70 is installed between a pair of opposed bearings.

In operation, conveyor roll 70 rotates as articles are conveyed over the roll. Because conveyor roll 70 is secured in fixed angular relationship to outer race 12, the outer race and end cap 16 crimpingly secured thereto rotate with the conveyor roll. Hub 18 and inner race 14 fixedly mounted thereon remain in fixed angular relationship to the nonrotating support shaft (not shown). Consequently, end cap 16 rotates against seal 32. However, seal 32 and thrust bearing wall 30 seal side 19b of raceway 19 regardless of their relative angular orientation. Similarly, bottom wall 22 of outer race 12 and inner race 14 cooperate to shield side 19a of raceway 19.

ALTERNATIVE EMBODIMENT

An alternative embodiment 110 is illustrated in FIG. 3 and generally includes outer race 112, inner race 114, end cap 16 and hub 118. Outer race 112 is substantially similar to outer race 12 previously described with the exception that aperture 142 may be a larger diameter than aperture 42 such that bottom wall 122 terminates at a radial position short of outer periphery 126 of inner race 114. Inner race 114 is a generally cylindrical stamped member including an outer peripheral surface 126 defining an inner raceway 144. Inner surface 127 of inner race 114 is convex inwardly. Shaft engaging flange 129 extends radially inwardly from one side of inner race 114 to engage support shaft (not shown). Flange 129 defines hex bore 131 of generally identical shape and size to hex bore 162 of hub 118 to prevent relative rotation between inner race 114 and the support shaft (not shown). Hub 118 is generally identical to hub 18 previously described with the exception of the shape of the outer surface of neck 160, which is concave outwardly to closely receive inner race 114. End cap 16 and ball complement 28 of bearing 110 are identical to end cap 16 and ball complement 28, respectively, of bearing 10. Ball retainer 48 is not shown in FIG. 3; but can be used, as in FIG. 1, if desired.

The operation of bearing 110 is generally the same as that of bearing 10 previously described. Specifically, conveyor roll 70 is press-fit onto outer race 112, and bearing 110 is mounted on a support shaft (not shown). Inner race 114 engages the support shaft through flange 129 to both help dissipate static charge within bearing 110 and to prevent relative rotation between the inner race and the support shaft. It is not necessary that hub 118 be electrically conductive because of the direct engagement of electrically conductive inner race 114 with the support shaft.

The above descriptions are those of preferred embodiments of the invention. Various changes and alterations might be made without departing from the spirit and broader aspects of the invention as set forth in the claims, which are to be interpreted in accordance with the principles of patent law, including the doctrine of equivalents.

The embodiments of the invention in which an exclusive property or privilege is claimed are defined as follows:

1. A bearing comprising:
   a cup-shaped outer race means for receiving a complement of rolling elements, said outer race means including an outer wall portion terminating in a rim portion extending radially outwardly from said outer wall, said outer race means further including an end wall portion extending radially inwardly from said outer wall portion;
   an inner race means for defining a raceway together with said outer race means;
   a plurality of rolling elements within said raceway;
   an end cap crimpingly secured to said rim portion of said outer race means, said end cap including a peripheral crimp portion crimped about said rim portion, said end cap including a load bearing thrust support portion extending radially inwardly from said peripheral portion to provide lateral support for said rolling elements; and
   an electrically conductive hub member supporting said inner race member, said hub member including an annular sealing portion contacting said end cap to seal said raceway, said hub member comprising a polymer filled with an electrically conductive material.

2. A bearing comprising:
   a cup-shaped outer race means for receiving a complement of rolling elements, said outer race means including an outer wall portion terminating in a rim portion extending radially outwardly from said outer wall, said outer race means further including an end wall portion extending radially inwardly from said outer wall portion;
   an inner race means for defining a raceway together with said outer race means;
   a plurality of rolling elements within said raceway;
   an end cap crimpingly secured to said rim portion of said outer race means, said end cap including a peripheral crimp portion crimped about said rim portion, said end cap including a load bearing thrust support portion extending radially inwardly from said peripheral portion to provide lateral support for said rolling elements; and an electrically conductive hub member supporting said inner race member, said hub member including an annular sealing portion contacting said end cap to seal said raceway, said hub member comprising a polymer dip-coated with an electrically conductive material.

3. A bearing comprising:

a cup-shaped outer race means for receiving a row of rolling elements, said outer race means including an outer wall portion terminating in a rim portion, said outer race means further including an end wall portion extending radially inwardly from said outer wall portion;

an inner race means for defining a raceway together with said outer race means;

a plurality of rolling elements within said raceway;

an end cap including means for securing said end cap to said outer race means, said end cap further including a thrust bearing wall portion extending radially inwardly from adjacent said rim portion to provide a load bearing thrust surface for direct contact by said roller bearing elements; and an electrically conductive hub member supporting said inner race member, said hub member including an annular sealing portion engaging said end cap to seal said raceway, said hub member comprising a polymer filled with an electrically conductive material.

4. A bearing comprising:

a cup-shaped outer race means for receiving a row of rolling elements, said outer race means including an outer wall portion terminating in a rim portion, said outer race means further including an end wall portion extending radially inwardly from said outer wall portion;

an inner race means for defining a raceway together with said outer race means;

a plurality of rolling elements within said raceway;

an end cap including means for securing said end cap to said outer race means, said end cap further including a thrust bearing wall portion extending radially inwardly from adjacent said rim portion to provide a load bearing thrust surface for direct contact by said roller bearing elements; and an electrically conductive hub member supporting said inner race member, said hub member including an annular sealing portion engaging said end cap to seal said raceway, said hub member comprising a polymer dip-coated with an electrically conductive material.

5. A bearing comprising:

an inner race member;

an outer race member, said race members together defining a raceway having first and second sides, said outer race member including an annular shield portion extending radially inwardly to a position closely proximate the outer periphery of said inner race member to shield said first raceway side, said outer race member including an annular lip portion opposite said annular sealing portion;

a plurality of rolling elements within said raceway;

an end cap secured to said lip portion to shield said second raceway side, said end cap including a load bearing thrust support portion to provide lateral support for said rolling elements; and a hub means secured within said inner race for mounting said bearing on a shaft, said hub means being electrically conductive to dissipate static charges within said bearing, said hub means comprising a polymer filled with an electrically conductive material, said hub means including an annular seal portion contacting and biased against said end cap to cooperate with said end cap to seal said second raceway side.

6. A bearing comprising:

an inner race member;

an outer race member, said race members together defining a raceway having first and second sides, said outer race member including an annular shield portion extending radially inwardly to a position closely proximate the outer periphery of said inner race member to shield said first raceway side, said outer race member including an annular lip portion opposite said annular sealing portion;

a plurality of rolling elements within said raceway;

an end cap secured to said lip portion to shield said second raceway side, said end cap including a load bearing thrust support portion to provide lateral support for said rolling elements; and a hub means secured within said inner race for mounting said bearing on a shaft, said hub means being electrically conductive to dissipate static charges within said bearing, said hub means comprising a polymer dip-coated with an electrically conductive material, said hub means including an annular seal portion contacting and biased against said end cap to cooperate with said end cap to seal said second raceway side.

7. A bearing comprising:

a one-piece hub member including an integral annular sealing flange extending generally radially outwardly from the remainder of said hub member;

an inner race member supported on said hub member;

a cup-shaped outer race member defining a ball race with said inner race member, said outer race member including an annular end wall extending radially inwardly beyond said inner race member to shield a first side of said ball race; and an end cap secured to said outer race member opposite said end wall across said ball race, said end cap including a thrust bearing flange extending radially inwardly from said outer race member to provide a thrust bearing surface for direct contact by balls within said ball race, said hub sealing flange engaging said end cap to seal a second side of said ball race.

8. A bearing as defined in claim 7 wherein said outer race member comprises a rim portion including a crimping bead, and wherein said end cap includes a peripheral margin portion crimped about said crimping bead.

9. A bearing as defined in claim 7 wherein said hub member is electrically conductive to dissipate static charge from said bearing.

10. A bearing as defined in claim 7 wherein said hub sealing flange is biased against said end cap.

* * * * *